US010209362B2

(12) United States Patent
Nazemi et al.

(10) Patent No.: US 10,209,362 B2
(45) Date of Patent: Feb. 19, 2019

(54) DETECTING, TRACKING, AND DECODING PULSE REPETITION FREQUENCY LASER ENERGY FROM LASER DESIGNATORS

(71) Applicant: Sensors Unlimited, Inc., Princeton, NJ (US)

(72) Inventors: Jonathan Nazemi, Doylestown, PA (US); Robert Rozploch, Newtown, PA (US); John P. Barby, Robbinsville, NJ (US); Andrew Eckhardt, Richboro, PA (US)

(73) Assignee: Sensors Unlimited, Inc., Princeton, NJ (US)

(*) Notice: Subject to any disclaimer, the term of this patent is extended or adjusted under 35 U.S.C. 154(b) by 100 days.

(21) Appl. No.: 14/938,409

(22) Filed: Nov. 11, 2015

(65) Prior Publication Data

US 2016/0282179 A1 Sep. 29, 2016

Related U.S. Application Data

(60) Provisional application No. 62/140,250, filed on Mar. 30, 2015, provisional application No. 62/139,401, (Continued)

(51) Int. Cl.

*G01J 1/44* (2006.01)
*G01S 17/66* (2006.01)
(Continued)

(52) U.S. Cl.

CPC .............. *G01S 17/66* (2013.01); *F41G 3/145* (2013.01); *F41G 3/165* (2013.01); *F41G 7/226* (2013.01);
(Continued)

(58) Field of Classification Search

CPC ............................ G01J 1/44; G01J 2001/4238
See application file for complete search history.

(56) References Cited

U.S. PATENT DOCUMENTS 4,003,659 A 1/1977 Conard et al.
6,323,941 B1 11/2001 Evans et al.
(Continued)

FOREIGN PATENT DOCUMENTS

EP 2816309 A2 12/2014
EP 2816310 A2 12/2014
EP 2816312 A2 12/2014

OTHER PUBLICATIONS

Belgian Search Report and Opinion dated Nov. 17, 2016 issued during the prosecution of Belgian Patent Application No. 2016/5217 (13 pages).

*Primary Examiner* — Marcus Taningco
(74) *Attorney, Agent, or Firm* — Locke Lord LLP; Scott D. Wofsy; Joshua L. Jones

(57) ABSTRACT

A pulse repetition frequency detector, tracker, and decoder includes a two-dimensional InGaAs FPA of photodetectors configured to convert laser signals into electrical signals. A ROIC is operatively connected to the InGaAs FPA to condition electrical signals from the InGaAs FPA. A module is operatively connected to the ROIC to decode pulsed codes in the conditioned electrical signals and to provide output for tracking decoded laser spots in two-dimensional space. In another aspect, an imaging device includes an imager with an imaging FPA operatively connected to a first ROIC for imaging. A pulse repetition frequency detector, tracker, and decoder including a second ROIC as described above, is operatively connected to the first ROIC. The first and second ROICs are operatively connected to correlate the position of decoded laser spots in images from the imaging FPA.

16 Claims, 2 Drawing Sheets

30
10
20
50

Related U.S. Application Data filed on Mar. 27, 2015, provisional application No. 62/139,371, filed on Mar. 27, 2015.

(51) Int. Cl.

| | |
|---|---|
| ***F41G 3/14*** | (2006.01) |
| ***F41G 7/22*** | (2006.01) |
| ***G01J 1/02*** | (2006.01) |
| ***G01J 1/04*** | (2006.01) |
| ***G01S 17/00*** | (2006.01) |
| ***G01S 7/484*** | (2006.01) |
| ***G01S 7/486*** | (2006.01) |
| ***F41G 3/16*** | (2006.01) |
| *G01J 1/42* | (2006.01) |

(52) U.S. Cl.

CPC .......... *F41G 7/2293* (2013.01); *G01J 1/0295* (2013.01); *G01J 1/0488* (2013.01); *G01J 1/44* (2013.01); *G01S 7/484* (2013.01); *G01S 7/4861* (2013.01); *G01S 17/003* (2013.01); *G01J 2001/4238* (2013.01)

(56) References Cited

U.S. PATENT DOCUMENTS

| | | | | |
|---|---|---|---|---|
| 7,773,202 | B2 | 8/2010 | Crawford et al. | |
| 8,130,367 | B2 | 3/2012 | Stettner et al. | |
| 8,243,103 | B2 | 8/2012 | Dobbie et al. | |
| 8,378,279 | B2 | 2/2013 | Mourar et al. | |
| 8,451,432 | B2 | 5/2013 | Crawford et al. | |
| 8,462,323 | B2 | 6/2013 | Markov et al. | |
| 8,606,496 | B2 | 12/2013 | Stettner et al. | |
| 8,829,404 | B1 | 9/2014 | Rinker | |
| 2009/0226178 | A1 | 9/2009 | Filep | |
| 2010/0067608 | A1 | 3/2010 | Tyree et al. | |
| 2010/0108859 | A1* | 5/2010 | Andressen ............. | H04N 5/335<br>250/203.2 |
| 2011/0121159 | A1 | 5/2011 | Mourar et al. | |
| 2012/0211665 | A1 | 8/2012 | Cloud et al. | |
| 2012/0248288 | A1 | 10/2012 | Linder et al. | |
| 2012/0249781 | A1 | 10/2012 | Vollmerhausen | |
| 2012/0261553 | A1 | 10/2012 | Elkind et al. | |
| 2013/0153745 | A1 | 6/2013 | Schmitt et al. | |
| 2014/0231576 | A1 | 8/2014 | Rinker | |
| 2014/0312161 | A1 | 10/2014 | Ell | |

* cited by examiner

DETECTING, TRACKING, AND DECODING PULSE REPETITION FREQUENCY LASER ENERGY FROM LASER DESIGNATORS

CROSS-REFERENCE TO RELATED APPLICATIONS

The subject application claims the benefit of priority to U.S. Provisional Patent Application Ser. No. 62/139,401, filed on Mar. 27, 2015; 62/139,371, filed Mar. 27, 2015; and 62/140,250, filed Mar. 30, 2015, the disclosure of which are herein incorporated by reference in its entirety.

BACKGROUND OF THE INVENTION

1. Field of the Invention

The present disclosure relates to laser designation, and more particularly to detection, tracking, and decoding of pulsed laser signatures from pulsed laser designators.

2. Description of Related Art

A variety of devices and methods are known in the art for laser spot tracking. A traditional laser designation system includes a laser designator, which is used to illuminate or paint an object of interest. The laser designator emits laser pulses in a predetermined pulse train according to the setting as designated by the user. A tracking device can detect the laser spot and track it.

Such conventional methods and systems have generally been considered satisfactory for their intended purpose. However, there is still a need in the art for improved laser designator pulse detection. The present disclosure provides a solution for this need.

SUMMARY OF THE INVENTION

A Pulse Repetition Frequency (PRF) detector and decoder includes a two-dimensional Indium Gallium Arsenide (InGaAs) Focal Plane Array (FPA) of photodetectors configured to convert incident laser energy into electrical signals. A Read Out Integrated Circuit (ROIC) is operatively connected to the FPA to condition electrical signals from the FPA. A module is operatively connected to the ROIC to detect, decode, and track pulsed laser energy in the conditioned electrical signals and to provide output for tracking decoded laser spots in two-dimensional space.

The InGaAs FPA can be configured to receive wavelengths up to and including 1700 nm, for example SWIR wavelengths of 1064 nm, 1550 nm wavelength, or any other suitable wavelength. The InGaAs FPA can include a plurality of rows and a plurality of columns of photodetectors. The InGaAs FPA can include at least a 32 by 32 array of photodetectors.

The ROIC can be configured to read from the InGaAs FPA at a frequency of at least 20 kHz. The ROIC can be operatively connected to the InGaAs FPA to condition electrical signals for tracking and decoding multiple laser spots at a time in the module.

The module operatively connected to the ROIC can include machine readable instructions configured to instruct the module to: receive signals from the ROIC for a series of images over time of pulsed energy reflected from the at least one target, each image including a plurality of pulses related to different laser designators; detect the pulses in an image of the received images; output pulse detection information including XY pixel coordinates and arrival time information associated with the respective detected pulses; associate the pulse detection information with the a specific laser designator source; and generate output position information for the at least one target in space, the output position being based on the XY pixel coordinates and associated with the corresponding laser designator. It is also contemplated that the machine readable instructions can include instructions configured to instruct the module to: determine whether a distance between the associated XY pixel coordinates associated with one of the detected pulses relative to pulse detector information associated with a previously received detected pulse having the same pulse code is within a predetermined threshold value; and if so, validate pulse detector information associated with that one of the detected pulses.

A filter assembly can be coupled to the photodetector system to improve signal to noise ratio. An output connector can be included to connect to an imaging device for communication of decoded laser pulse data from the module to an imaging device.

In another aspect, an imaging device includes an imager with an imaging FPA operatively connected to a first ROIC for imaging. A pulse repetition frequency decoder including a second ROIC as described above, is operatively connected to the first ROIC. The first and second ROICs are operatively connected to correlate the position of decoded laser spots in images from the imaging FPA. For example, the imaging FPA can be configured for imaging in at least one of visible, thermal, night vision, and/or any other suitable wavelengths, and the InGaAs FPA can be configured to receive wavelengths up to and including 1700 nm.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
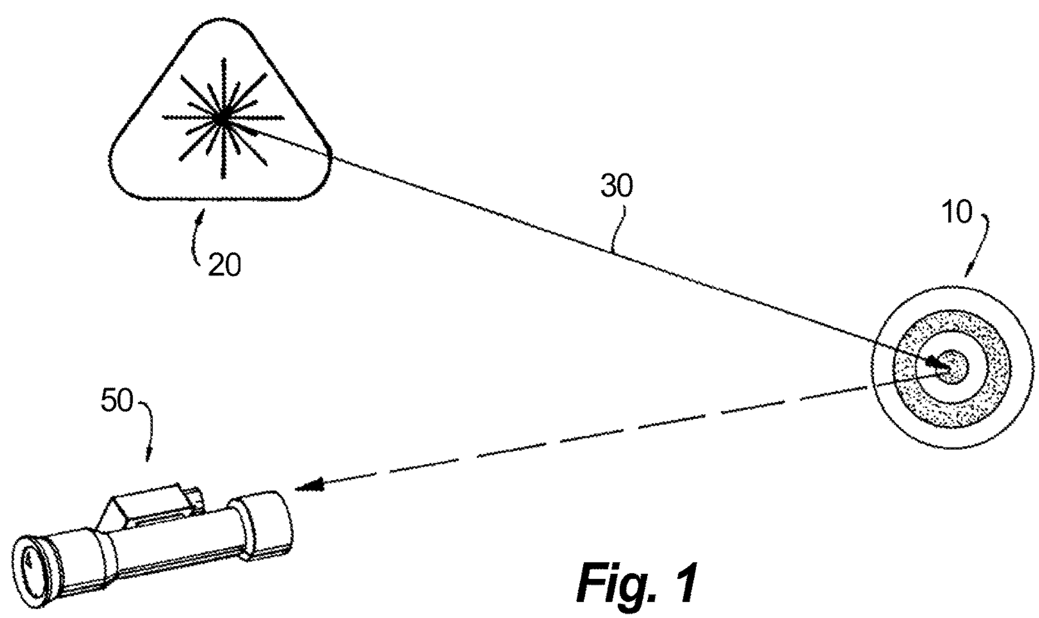
FIG. 1 is a schematic view of an exemplary embodiment of an imaging device constructed in accordance with the present disclosure, showing a laser designator and target.

Reference will now be made to the drawings wherein like reference numerals identify similar structural features or aspects of the subject disclosure. For purposes of explanation and illustration, and not limitation, a partial view of an exemplary embodiment of a pulse repetition frequency decoder in accordance with the disclosure is shown in FIG. 2 and is designated generally by reference character 100.

Other embodiments of decoders in accordance with the disclosure, or aspects thereof, are provided in FIGS. 1 and 3-5, as will be described. The systems and methods described herein can be used to detect and decode pulsed laser signals.

With reference first to FIG. 1, target 10 can be illuminated, or painted, by laser designator 20. The incident laser beam from laser designator 20 is identified with referenced character 30. A portion of beam 30 reflects from the target, as indicated by the dashed line in FIG. 1. System 50 receives a portion of the reflected laser from target 10. Laser designator 20 can pulse beam 30 with a predetermined code, and the pulses received by system 50 can be decoded to provide target information to a person or device using system 50.

Figure 2:
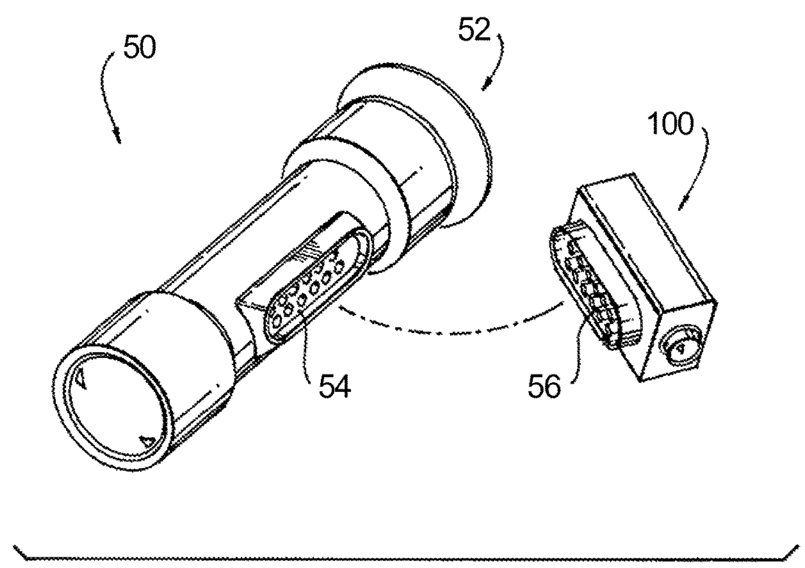
FIG. 2 is an exploded perspective view of an exemplary embodiment of an imaging device, showing the imager and the decoder.

With reference to FIG. 2, system 50 is an imaging device and includes imager 52 and decoder 100. Input connector 54 and output connector 56 connect imager to decoder 100 for communication of decoded laser pulse data from module 112 of decoder 100 to imager 52. Decoded laser pulse data from decoder 100 can be correlated with images of imager 52, for example, to display laser designation data on images in the eye piece of imager 52. It is also contemplated that in certain applications, autonomous devices could use the combined output of imager 52 and decoder 100 without the need for an eyepiece.

Figure 3:
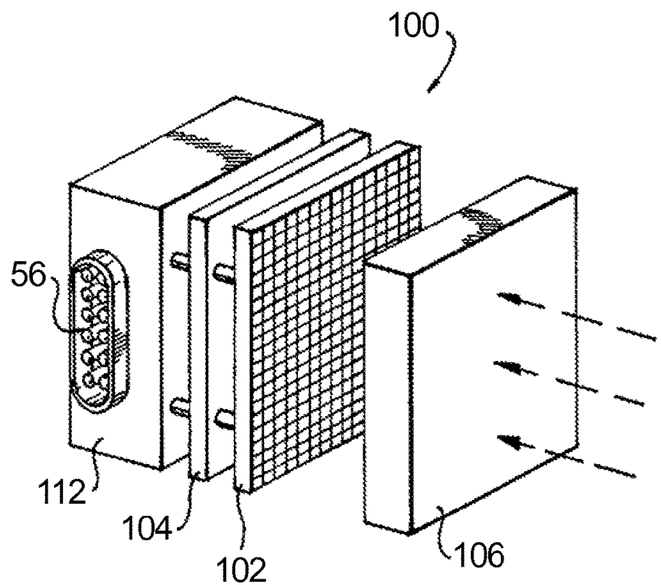
FIG. 3 is a schematic view of the decoder of FIG. 2, showing the focal plane array (FPA) with a two-dimensional array of pixels.

Referring now to FIG. 3, decoder 100 includes a laser detector having a two-dimensional InGaAs FPA 102 of photodetectors, i.e., pixels in a Focal Plane Array (FPA), configured to convert laser signals into electrical signals. A read-out integrated circuit (ROIC 104) is operatively connected to the InGaAs FPA 102 of photodetectors to detect pulsed codes in electrical signals from the InGaAs FPA 102 of photodetectors and to condition the voltages and signals.

The InGaAs FPA 102 of photodetectors includes a plurality of rows and a plurality of columns of photodetectors. Those skilled in the art will readily appreciate that any array geometry can be used, and that the rectangular array shown schematically in FIGS. 2 and 3 is only one example. It is contemplated that a suitable InGaAs FPA 102 can include at least a 32 by 32 array of photodetectors, for example. The InGaAs FPA 102 is formed of InGaAs. The InGaAs can be configured, e.g., the relative amounts of indium arsenide and gallium arsenide can be adjusted, to receive wavelengths up to and including 1.7 microns, such as InGaAs optimized for receiving 1064 nm wavelength radiation, 1550 nm wavelength radiation, or any other suitable wavelength.

An optical assembly 106 is optically coupled to InGaAs FPA 102, and can include one or more filter assemblies to improve signal to noise ratio and/or lens assemblies for forming an image of laser spots on InGaAs FPA 102 from incident radiation, e.g., from one or more designators 20 reflecting off of one or more targets 10. For example, optical assembly 106 can include a single element lens or a lens array to optimize the collection of laser energy, and a narrowband filter in front of the InGaAs FPA 102 to improve the signal to noise laser detection.

Figure 4:
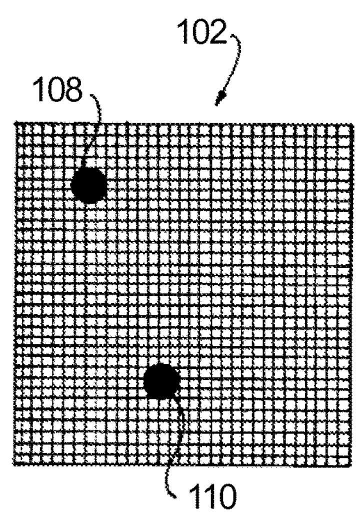
FIG. 4 is a schematic view of the focal plane array of FIG. 3, showing two laser spots on the two-dimensional array of pixels.

FIG. 4 schematically shows an image of two laser spots 108 and 110 received on InGaAs FPA 102. This demonstrates a considerable advantage over traditional laser pulse decoders using a quadrant configuration, since the laser spots 108 and 110 can be tracked in two-dimensional space with significantly greater spatial resolution, allowing the user or system to identify the location of the pulse in two-dimensional space with greater accuracy.

Referring again to FIG. 2, the ROIC 104 can have a frame rate, e.g., at least 20,000 fps (20 kHz), for reading sequential image frames from the InGaAs FPA 102. This rate allows ROIC 104 to detect pulse codes in the laser spots imaged on the InGaAs FPA 102. When laser energy from a designator 20 is incident upon InGaAs FPA 102, the signals are processed within an FPGA, or the like, to identify the location on the InGaAs FPA 102 which detected the pulse. The ROIC 104 can be operatively connected to the InGaAs FPA 102 to track and decode multiple laser spots at a time.

Supporting electronics in module 112, including the FPGA, are connected to receive data from ROIC 104 to decode pulsed codes in the conditioned electrical signals and to provide output for tracking decoded laser spots in two-dimensional space. Module 112 can include additional data processing components and output connectors/interfaces, e.g., for controlling a guidance or tracking system, for overlying laser spot information on an image from a separate imaging device, or the like.

Module 112 can include machine readable instructions configured to instruct module 112 to: receive signals from ROIC 104 for a series of images over time of pulsed energy reflected from the at least one target, each image including a plurality of pulses related to different first and second pulse codes; detect the pulses in an image of the received images; output pulse detection information including XY pixel coordinates and arrival time information associated with the respective detected pulses; associate the pulse detection information with the first and second pulse codes; and generate output position information for the at least one target in space, the output position being based on the XY pixel coordinates and associated with the corresponding first and second pulses. It is also contemplated that the machine readable instructions can include instructions configured to instruct module 112 to: determine whether a distance between the associated XY pixel coordinates associated with one of the detected pulses relative to pulse detector information associated with a previously received detected pulse having the same pulse code is within a predetermined threshold value; and if so, validate pulse detector information associated with that one of the detected pulses.

Figure 5:
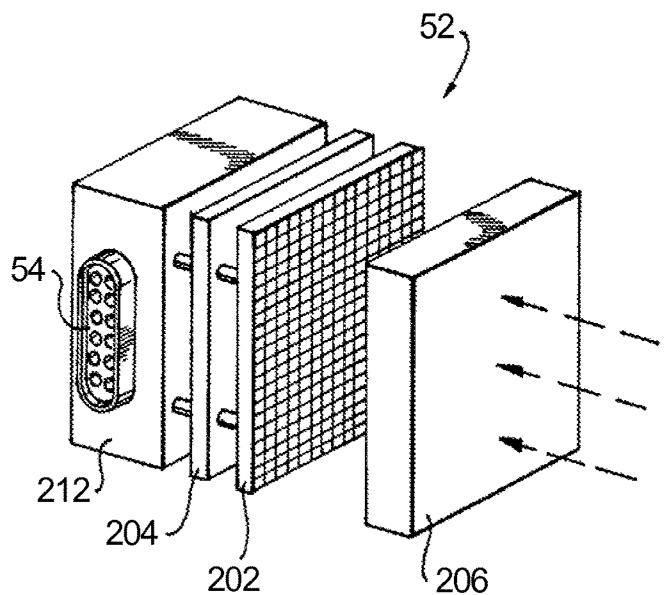
FIG. 5 is a schematic view of the imager of FIG. 2.

With reference now to FIG. 5, imager 52 includes an imaging FPA 202 operatively connected to a ROIC 204 for imaging. For example, the imaging FPA 202 can be configured for imaging in at least one of visible, thermal, night vision, and/or any other suitable wavelengths. An optical assembly 206 is optically coupled to imaging FPA 202, and can include one or more filter assemblies to improve signal to noise ratio and/or lens assemblies for forming an image. Module 212 is operatively connected to receive image data from ROIC 204 and includes supporting electronics and connector 54, e.g., for correlating image data from ROIC 204 and decoded laser data from ROIC 104. ROICs 104 and 204 are therefore operatively connected to correlate the position of decoded laser spots in images from the imaging FPA 202. Each of decoder 100 and imager 52 can be housed in a sealed mechanical housing.

The methods and systems of the present disclosure, as described above and shown in the drawings, provide for laser pulse detectors with superior properties including tracking and decoding multiple laser spots with high spatial resolution. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A pulse repetition frequency detector, tracker, and decoder system comprising:

a two-dimensional InGaAs FPA of photodetectors configured to convert laser signals into electrical signals;

a first ROIC operatively connected to the InGaAs FPA to condition electrical signals from the InGaAs FPA; and at least one module operatively connected to the first ROIC to decode pulsed codes in the conditioned electrical signals and to provide output for tracking decoded laser spots in two-dimensional space, wherein the at least one module includes machine readable instructions configured to instruct the at least one module to: receive signals from the first ROIC for a series of images over time of pulsed energy reflected from at least one target, each image including a plurality of pulses related to different first and second pulse codes; detect the pulses in an image of received images; output pulse detection information including XY pixel coordinates and arrival time information associated with the respective detected pulses; associate the pulse detection information with the first and second pulse codes; and generate output position information for the at least one target in space, the output position being based on the XY pixel coordinates and associated with the corresponding first and second pulses, wherein the at least one module is operatively connected to receive image data from a second ROIC and includes supporting electronics for correlating image data from the second ROIC and decoded laser data from the first ROIC so the first and second ROICs can be operatively connected to correlate the position of decoded laser spots in images from the FPA.

2. A decoder as recited in claim 1, wherein the InGaAs FPA is configured to receive wavelengths up to and including 1700 nm.

3. A decoder as recited in claim 1, wherein the InGaAs FPA is configured to detect laser light of 1064 nm wavelength.

4. A decoder as recited in claim 1, wherein the InGaAs FPA is configured to detect laser light of 1550 nm wavelength.

5. A decoder as recited in claim 1, wherein the first ROIC is configured to read from the InGaAs FPA at a frequency of at least 20 kHz.

6. A decoder as recited in claim 1, wherein the first ROIC is operatively connected to the InGaAs FPA to condition electrical signals for tracking and decoding multiple laser spots at a time in the module.

7. A decoder as recited in claim 1, wherein the InGaAs FPA includes a plurality of rows and a plurality of columns of photodetectors.

8. A decoder as recited in claim 1, wherein the InGaAs FPA includes at least a 32 by 32 array of photodetectors.

9. A decoder as recited in claim 1, further comprising a filter assembly optically coupled to the InGaAs FPA of photodetectors to improve signal to noise ratio.

10. A decoder as recited in claim 1, wherein the at least one module operatively connected to the ROIC includes machine readable instructions configured to instruct the module to:

associate the pulse detection information with a laser designator source; and generate output position information for the at least one target in space, the output position being based on the XY pixel coordinates and associated with the laser designator source.

11. A decoder as recited in claim 10, wherein the machine readable instructions include instructions configured to instruct the module to:

determine whether a distance between the associated XY pixel coordinates associated with one of the detected pulses relative to pulse detector information associated with a previously received detected pulse having the same pulse code is within a predetermined threshold value; and if so, validate pulse detector information associated with that one of the detected pulses.

12. A decoder as recited in claim 1, further comprising an output connector configured to connect to an imaging device for communication of decoded laser pulse data from the at least one module to an imaging device.

13. An imaging device comprising:

an imager including imaging FPA operatively connected to a first ROIC for imaging; and a pulse repetition frequency decoder operatively connected to the first ROIC, the decoder including:

a two-dimensional InGaAs FPA of photodetectors configured to convert laser signals into electrical signals; and a second ROIC operatively connected to the InGaAs FPA to decode pulsed codes in electrical signals from the InGaAs FPA, wherein the first and second ROICs are operatively connected to correlate the position of decoded laser spots in images from the imaging FPA at least one module includes machine readable instructions configured to instruct the at least one module to: receive signals from the first ROIC for a series of images over time of pulsed energy reflected from at least one target, each image including a plurality of pulses related to different first and second pulse codes; detect the pulses in an image of received images; output pulse detection information including XY pixel coordinates and arrival time information associated with the respective detected pulses; associate the pulse detection information with the first and second pulse codes; and generate output position information for the at least one target in space, the output position being based on the XY pixel coordinates and associated with the corresponding first and second pulses, wherein the at least one module is operatively connected to receive image data from the second ROIC and includes supporting electronics for correlating image data from the second ROIC and decoded laser data from the first ROIC so the first and second ROICs can be operatively connected to correlate the position of decoded laser spots in images from the imaging FPA.

14. An imaging device as recited in claim 13, wherein the imaging FPA is configured for imaging in at least one of visible, thermal, or night vision.

15. An imaging device as recited in claim 13, wherein the InGaAs FPA is configured to receive wavelengths up to and including 1700 nm.

16. A pulse repetition frequency detector, tracker, and decoder system comprising:

a two-dimensional InGaAs FPA of photodetectors configured to convert laser signals into electrical signals;

a ROIC operatively connected to the InGaAs FPA to condition electrical signals from the InGaAs FPA; and a module operatively connected to the ROIC to decode pulsed codes in the conditioned electrical signals and to provide output for tracking decoded laser spots in two-dimensional space, wherein the module is operatively connected to the ROIC and includes machine readable instructions configured to instruct the module to:

receive signals from the ROIC for a series of images over time of pulsed energy reflected from the at least one target, each image including a plurality of pulses related to different first and second pulse codes;

detect the pulses in an image of the received images;

output pulse detection information including XY pixel coordinates and arrival time information associated with the respective detected pulses;

associate the pulse detection information with a laser designator source;

generate output position information for the at least one target in space, the output position being based on the xy pixel coordinates and associated with the laser designator source;

determine whether a distance between the associated XY pixel coordinates associated with one of the detected pulses relative to pulse detector information associated with a previously received detected pulse having the same pulse code is within a predetermined threshold value; and if so, validate pulse detector information associated with that one of the detected pulses.

* * * * *

UNITED STATES PATENT AND TRADEMARK OFFICE

CERTIFICATE OF CORRECTION

PATENT NO. : 10,209,362 B2
APPLICATION NO. : 14/938409
DATED : February 19, 2019
INVENTOR(S) : Jonathan Nazemi et al.

It is certified that error appears in the above-identified patent and that said Letters Patent is hereby corrected as shown below:

In the Claims

Column 6 Line 18 Claim 13: “and” should be deleted

Column 6 Line 23 Claim 13 should read: decoded laser spots in images from the imaging FPA; and Column 6 Line 24 Claim 13 should read: at least one module including machine readable Signed and Sealed this
Twentieth Day of August, 2019

Andrei Iancu
*Director of the United States Patent and Trademark Office*